United States Patent
Maki

(10) Patent No.: US 7,345,749 B2
(45) Date of Patent: Mar. 18, 2008

(54) VEHICLE BODY SLIP ANGLE DETECTING APPARATUS, VEHICLE BODY SLIP ANGLE DETECTING METHOD, AND VEHICLE MOTION CONTROL APPARATUS PROVIDED WITH THE VEHICLE BODY SLIP ANGLE DETECTING APPARATUS

(75) Inventor: Kazuya Maki, Nagoya (JP)

(73) Assignee: Advics Co., Ltd., Kariya, Aichi-pref. (JP)

( * ) Notice: Subject to any disclaimer, the term of this patent is extended or adjusted under 35 U.S.C. 154(b) by 0 days.

(21) Appl. No.: 11/402,133

(22) Filed: Apr. 12, 2006

(65) Prior Publication Data

US 2006/0239508 A1    Oct. 26, 2006

(30) Foreign Application Priority Data

Apr. 26, 2005   (JP)  ............................. 2005-128252

(51) Int. Cl.
*G01B 11/26* (2006.01)
(52) U.S. Cl. .................................................. 356/141.2
(58) Field of Classification Search .............. 356/141.2
See application file for complete search history.

(56) References Cited

U.S. PATENT DOCUMENTS

2005/0102083 A1*   5/2005   Xu et al. ...................... 701/70

FOREIGN PATENT DOCUMENTS

JP    2000-081322 A    3/2000

\* cited by examiner

*Primary Examiner*—Thomas H. Tarcza
*Assistant Examiner*—Luke D. Ratcliffe
(74) *Attorney, Agent, or Firm*—Buchanan Ingersoll & Rooney PC

(57) ABSTRACT

This apparatus specifies, based upon the front image that is photographed by a front camera 65*f* before the present time by a predetermined time, the position (point A) of the "object" in the front image by utilizing the difference in brightness, and specifies, based upon the rear image photographed by a rear camera 65*r* at the present time, the position (point C) of the object same as the aforesaid "object" in the rear image by utilizing the difference in brightness. This apparatus obtains the displacement amount m in the image lateral direction of the position (point C) of the specified "same object" in the rear image with respect to the position (point B) of the aforesaid "same object" in the rear image that is to be specified supposing that the vehicle body slip angle $\theta$ is "0", and detects the vehicle body slip angle $\theta$ according to the equation of "$\theta=\tan^{-1}(m/L)$" (L: camera-to-camera distance).

9 Claims, 11 Drawing Sheets

VEHICLE BODY SLIP ANGLE DETECTING APPARATUS, VEHICLE BODY SLIP ANGLE DETECTING METHOD, AND VEHICLE MOTION CONTROL APPARATUS PROVIDED WITH THE VEHICLE BODY SLIP ANGLE DETECTING APPARATUS

BACKGROUND OF THE INVENTION

1. Field of the Invention

The present invention relates to a vehicle body slip angle detecting apparatus that detects a vehicle body slip angle which is an angle made by the direction of the vehicle body (i.e., longitudinal direction of the vehicle body) and the advancing direction of the vehicle body, a vehicle body slip angle detecting method, and a vehicle motion control apparatus provided with the vehicle body slip angle detecting apparatus.

2. Description of the Related Art

Conventionally, there has been widely known a vehicle motion control apparatus that performs a vehicle stabilization control (e.g., over-steer suppression control) in order to maintain running stability of the vehicle when the vehicle is in the turning state and the vehicle body slip angle becomes not less than a predetermined value. Accordingly, it is necessary to precisely obtain the vehicle body slip angle in order to precisely start and execute the above-mentioned vehicle stabilization control.

In general, the vehicle body slip angle is estimated on the basis of the vehicle body speed, lateral acceleration detected by a lateral acceleration sensor, yaw rate detected by a yaw rate sensor, and a known given equation that requires a time integrated calculation. However, an error is likely to occur in the time integrated calculation. Therefore, it is difficult to precisely estimate the vehicle body slip angle by this technique.

In recent years, a camera for photographing the road surface on which the vehicle is running is fixed to a predetermined position of the vehicle body, and attempts have been made to detect the vehicle body slip angle by utilizing the image photographed by the camera, as disclosed in Japanese Unexamined Patent Application No. 2000-81322.

More specifically, the above-mentioned reference discloses a technique for detecting the vehicle body slip angle on the basis of the flow direction of the road surface in the image by utilizing that the flow of the road surface during the exposure time of the camera appears on the image of the road surface.

In order to precisely detect the vehicle body slip angle (in particular, very small slip angle) by adopting this technique, it is necessary to precisely obtain the flow direction of the road surface in the image thereof. For this, it is necessary to sufficiently secure the range (particularly, the length of the road surface in the longitudinal direction of the vehicle body in the image thereof) of the road surface on the image thereof.

However, it is generally difficult to sufficiently secure the road surface on the image thereof photographed by the camera fixed to the vehicle body. Therefore, it is also difficult to precisely estimate the vehicle body slip angle (in particular, a very small slip angle) with the technique disclosed in the aforesaid reference.

SUMMARY OF THE INVENTION

The present invention is accomplished in view of the aforesaid problem, and aims to provide a vehicle body slip angle detecting apparatus or the like that can precisely estimate the vehicle body slip angle by utilizing an image of a road surface photographed by a camera fixed to the vehicle body.

A vehicle body slip angle detecting apparatus according to the present invention comprises a front camera that is fixed to the front section of the vehicle body of a vehicle for photographing the road surface on which the vehicle is running; a rear camera that is fixed to the rear section of the vehicle body of a vehicle for photographing the road surface on which the vehicle is running; and vehicle body slip angle detecting means that detects the vehicle body slip angle of the vehicle on the basis of the comparison result between the front image that is the image photographed by the front camera and the rear image that is the image photographed by the rear camera.

Here, the front camera is, for example, arranged and fixed at the front bumper section of the vehicle body so as to be capable of photographing a predetermined range near below the front bumper section of the vehicle body. Similarly, the rear camera is, for example, arranged and fixed at the rear bumper section of the vehicle body so as to be capable of photographing a predetermined range near below the rear bumper section of the vehicle body. A CCD camera (charge coupling device camera) is adopted, for example, as the front and rear cameras.

In case where the front camera and rear camera photograph the road surface including the same object thereon, the magnitude of the vehicle body slip angle appears as the difference between the position of the object in the front image and the position of the same object in the rear image. Accordingly, the vehicle body slip angle can be detected on the basis of the comparison result between the front image and the rear image as described above.

In addition, the length of the vehicle body in the longitudinal direction (e.g., the distance between the bumper section at the front of the vehicle and the bumper section at the rear of the vehicle in the longitudinal direction of the vehicle body) is sufficiently longer than the road surface on the image thereof, in the longitudinal direction, photographed by the cameras fixed to the vehicle body.

Therefore, even if the vehicle body slip angle is very small, the difference between the position of the object in the front image and the position of the same object in the rear image becomes relatively great. Accordingly, the vehicle body slip angle can be more precisely detected compared to the technique disclosed in the aforesaid reference, even if the vehicle body slip angle is very small.

The specific embodiment of the vehicle body slip angle detecting apparatus according to the present invention is configured, for example, to include object-position specifying means that specifies, based upon the front image, the position of the object in the front image; and same-object-position specifying means that specifies, based upon the rear image, the position of the object, which is same as the object whose position is specified by the object-position specifying means, in the rear image, wherein the vehicle body slip angle detecting means is configured to detect the vehicle body slip angle on the basis of the comparison result between the position of the same object, in the rear image, specified by the same-object-position specifying means and the position of the same object, in the rear image, that is to be specified by the same-object-position specifying means, supposing that the vehicle body slip angle is zero.

More specifically, the vehicle body slip angle detecting means can be configured to detect the vehicle body slip angle on the basis of the displacement amount of the position of the same object, which is specified by the same-object-position specifying means, in the rear image, in the direction in the rear image corresponding to the lateral direction of the vehicle body, with respect to the position of the same object in the rear image that is to be specified by the same-object-position specifying means, supposing that the vehicle body slip angle is zero, and the distance between the front camera and the rear camera in the longitudinal direction of the vehicle body (described later in detail).

Preferably, in case where the vehicle body slip angle detecting apparatus according to the present invention has the object-position specifying means and the same-object-position specifying means, it further comprises storing means for storing the front images photographed in the past by the front camera, wherein the same-object-position specifying means is configured to specify, based upon the rear image (photographed at a certain point (e.g., present time)), the position of the object, which is the same as the object whose position is specified by the object-position specifying means based upon the stored front image that is photographed before a predetermined time (from the above-mentioned certain point (e.g., present time)), in the rear image. In this case, it is preferable that the same-object-position specifying means is configured to determine the predetermined time on the basis of the vehicle body speed and the distance between the front camera and the rear camera in the longitudinal direction of the vehicle body.

The object same as the object on the road surface photographed by the front camera at a certain point can be photographed by the rear camera after this certain point by a time (hereinafter referred to as "delay time") obtained by the division of the distance between the front camera and the rear camera in the longitudinal direction of the vehicle body by the vehicle body speed.

In other words, in order to specify the object same as the object photographed by the front camera from the image photographed by the rear camera at a certain point, it is necessary to select the object specified, as the object, based upon the front image photographed by the front camera before the certain point by the delay time. Accordingly, with this configuration, the object same as the object photographed by the front camera can more precisely be specified from the image photographed by the rear camera, and hence, the vehicle body slip angle can more precisely be detected.

Preferably, in case where the vehicle body slip angle detecting apparatus according to the present invention has the object-position specifying means and the same-object-position specifying means, the object-position specifying means is configured to specify the position of the object in the front image by utilizing the difference in brightness in the front image. Similarly, in this case, it is preferable that the same-object-position specifying means is configured to specify the position of the same object in the rear image by utilizing the difference in brightness in the rear image.

Even in case where a monochrome image is used, the brightness in the image can be represented, for example, by a gray scale having a great number of tones (e.g., 256 tones). In other words, a monochrome image can be adopted as the front image and the rear image with this configuration. Accordingly, a relatively cheap camera that cannot provide a color image can be used. As a result, the production cost for the entire apparatus can be reduced.

A vehicle body slip angle detecting method according to the present invention adopted by the vehicle body slip angle detecting apparatus of the present invention is specifically a method for detecting the vehicle body slip angle based upon the comparison result between the front image photographed by the front camera and the rear image photographed by the rear camera.

Further, with the use of the vehicle body slip angle detecting apparatus according to the present invention, a vehicle motion control apparatus can be configured that has vehicle stabilization control means for starting and executing a vehicle stabilization control for maintaining the vehicle stability on the basis of the vehicle body slip angle detected by the vehicle body slip angle detecting apparatus. Accordingly, a vehicle stabilization control such as an over-steer suppression control can precisely be started and executed on the basis of the precisely detected vehicle body slip angle (particularly, a very small slip angle).

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4(*b*) is a view showing one example of a rear image photographed by the rear camera in case where the vehicle body slip angle takes the angle shown in FIG. 3;

FIG. 5 is a flowchart showing a routine executed by the CPU shown in FIG. 1 for calculating wheel speeds and the like;

DESCRIPTION OF THE PREFERRED EMBODIMENT

Figure 1:
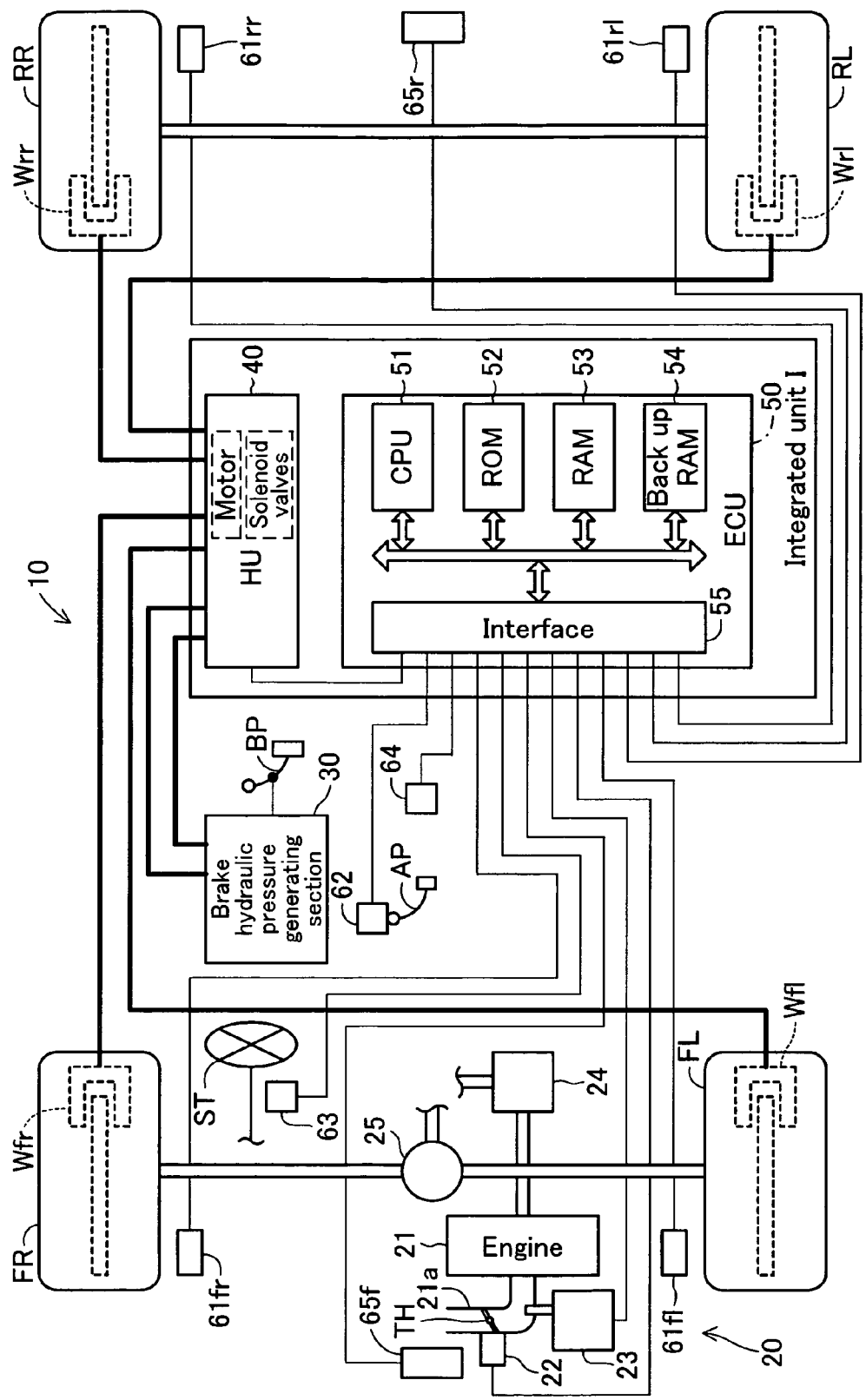
FIG. 1 is a schematic structural diagram of a vehicle equipped with a vehicle motion control apparatus including a vehicle body slip angle detecting apparatus according to an embodiment of the present invention.

Below, an embodiment of a vehicle motion control apparatus including a vehicle body slip angle detecting apparatus according to the present invention will be described while referring to the drawings. FIG. 1 schematically illustrates a vehicle on which a motion control apparatus 10 according to the embodiment of the present invention is mounted. The illustrated vehicle is a front-wheel-drive vehicle.

The motion control apparatus 10 has a drive force transmission mechanism section 20 which generates a drive force and transmits it to drive wheels FL and FR; a brake hydraulic pressure control apparatus 30 for generating a braking force in each wheel by brake hydraulic pressure; an integrated unit I integrally composed of a hydraulic unit 40 (hereinafter simply referred to as "HU") and an electronic control apparatus 50 (hereinafter simply referred to as "ECU").

The drive force transmission mechanism section 20 comprises an engine 21 which generates a drive force; a throttle valve actuator 22 which is disposed in an intake pipe 21a of the engine 21 and controls the opening of a throttle valve TH and which varies the open cross-sectional area of the intake passage; and a fuel injection apparatus 23 which includes fuel injectors which spray fuel in the vicinity of unillustrated intake ports of the engine 21.

The drive force transmission mechanism section 20 also comprises a transmission 24 whose input shaft is connected to the output shaft of the engine 21; and a front-wheel-side differential 25 that is connected to the output shaft of the transmission 24 and properly distributes and transmits the drive force from the engine 21 to the front wheels FL and FR.

The brake hydraulic pressure generating section 30 includes an unillustrated known vacuum booster that operates in response to operation of the brake pedal BP, and an unillustrated master cylinder which is linked to the vacuum booster. The hydraulic pressure generating section 30 generates master cylinder hydraulic pressure corresponding to the operation force of the brake pedal BP. The structures and operations of the master cylinder and the vacuum booster are well known, and therefore an explanation of the details thereof will be omitted.

The HU 40 includes a hydraulic pump that automatically generates brake hydraulic pressure regardless of the operation on the brake pedal BP by a driver, a motor for driving the hydraulic pump, and plural electromagnetic solenoid valves for individually adjusting wheel cylinder hydraulic pressure of each wheel.

The HU 40 is configured such that when all the solenoid valves are in their unexcited states, brake hydraulic pressure (i.e., master cylinder hydraulic pressure) corresponding to the operation force of the brake pedal BP is supplied to the wheel cylinder W**.

Notably, the symbol "" appended to various variables and the like collectively represents the symbols fl, fr, rl and rr and indicates that the particular variable or the like applies to all of the wheels FR, FL, etc. of the vehicle. For example, the wheel cylinder W collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

The HU 40 is configured to individually adjust the brake forces applied to the respective wheels independently of operation of the brake pedal BP by the driver, when the motor (accordingly, the hydraulic pump) is driven and the predetermined solenoid valve is excited through the instruction from the ECU 50. Thus, the HU 40 can achieve vehicle stabilization control (specifically, over-steer suppression control and under-steer suppression control), which will be described later, in accordance with an instruction from the ECU 50 described later.

The ECU 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to wheel speed sensors 61**, accelerator opening sensor 62, steering angle sensor 63, and yaw rate sensor 64.

The wheel speed sensors 61fl, 61fr, 61rl and 61rr are electromagnetic-pickup-type sensors which respectively output signals having frequencies corresponding to the respective rotational speeds of the wheels FL, FR, RL and RR. The acceleration opening sensor 62 detects an operated amount of an accelerator pedal AP operated by a driver and outputs a signal indicative of the operation amount Accp of the accelerator pedal AP. The steering angle sensor 63 detects a rotational angle of a steering wheel ST from its neutral position and outputs a signal indicative of the actual steering angle θs. The yaw rate sensor 64 detects a yaw rate of the vehicle and outputs a signal indicative of the actual yaw rate Yr.

The steering angle θs is zero when the steering wheel ST is located at the neutral position. The steering angle θs assumes a positive value when the steering wheel ST is turned counterclockwise (as viewed from a driver side), and assumes a negative value when the steering wheel ST is turned clockwise. The actual yaw rate Yr assumes a positive value when the vehicle turns to the left (counterclockwise as viewed from the upper side of the vehicle), and assumes a negative value when the vehicle turns to the right.

Figure 2:
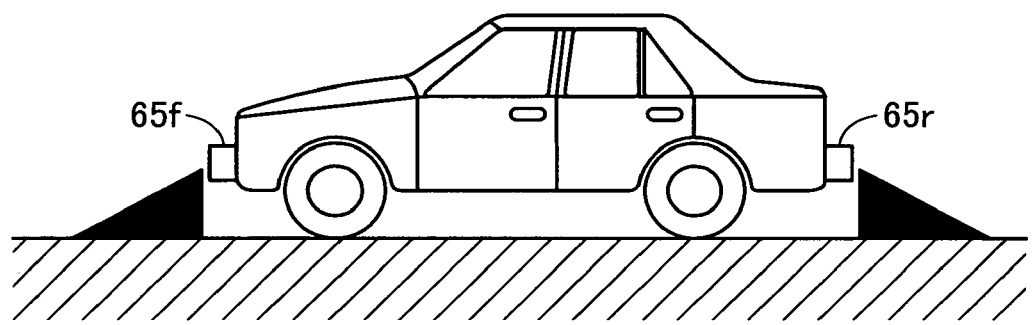
FIG. 2 is a view showing fixed states of a front camera and rear camera to the vehicle body.

The interface 55 is also connected to a front camera 65f and a rear camera 65r that are of CCD cameras (charge coupling device camera) capable of obtaining a monochrome image. As shown in FIG. 2, the front camera 65f is fixed to the central position of the vehicle body in the lateral direction at a bumper section at the front side of the vehicle body, while the rear camera 65r is fixed to the central position of the vehicle body in the lateral direction at a bumper section at the rear side of the vehicle body.

As a result, the front camera 65f can photograph the road surface within the range encircled by a rectangular near below the frontward bumper section at the central position of the vehicle body in the lateral direction. Similarly, the rear camera 65r can photograph the road surface within the range encircled by the same rectangular near below the rearward bumper section at the central position of the vehicle body in the lateral direction. Examples of cameras usable for these cameras 65f and 65r include cameras used for a well-known parking assisting system, obstacle detecting system, of the like.

The interface 55 supplies signals from the sensors 61 to 64 and the cameras 65f and 65r to the CPU 51. Further, in accordance with instructions from the CPU 51, the interface 55 outputs drive signals to the respective solenoid valves and the motor MT of the HU 40, the throttle valve actuator 22, the fuel injection apparatus 23, and the front and rear cameras 65f and 65r.

By virtue of the above-described configuration, the throttle valve actuator 22 drives the throttle valve TH such that the opening of the throttle valve TH basically coincides with an opening corresponding to the operation amount Accp of the accelerator pedal AP; and the fuel injection apparatus 23 injects fuel of a quantity which is required to obtain a predetermined target air-fuel ratio (theoretical air-fuel ratio) for cylinder-interior intake air quantity, which is the quantity of air taken into each cylinder.

Outline of Vehicle Body Slip Angle Detecting Method

Figure 3:
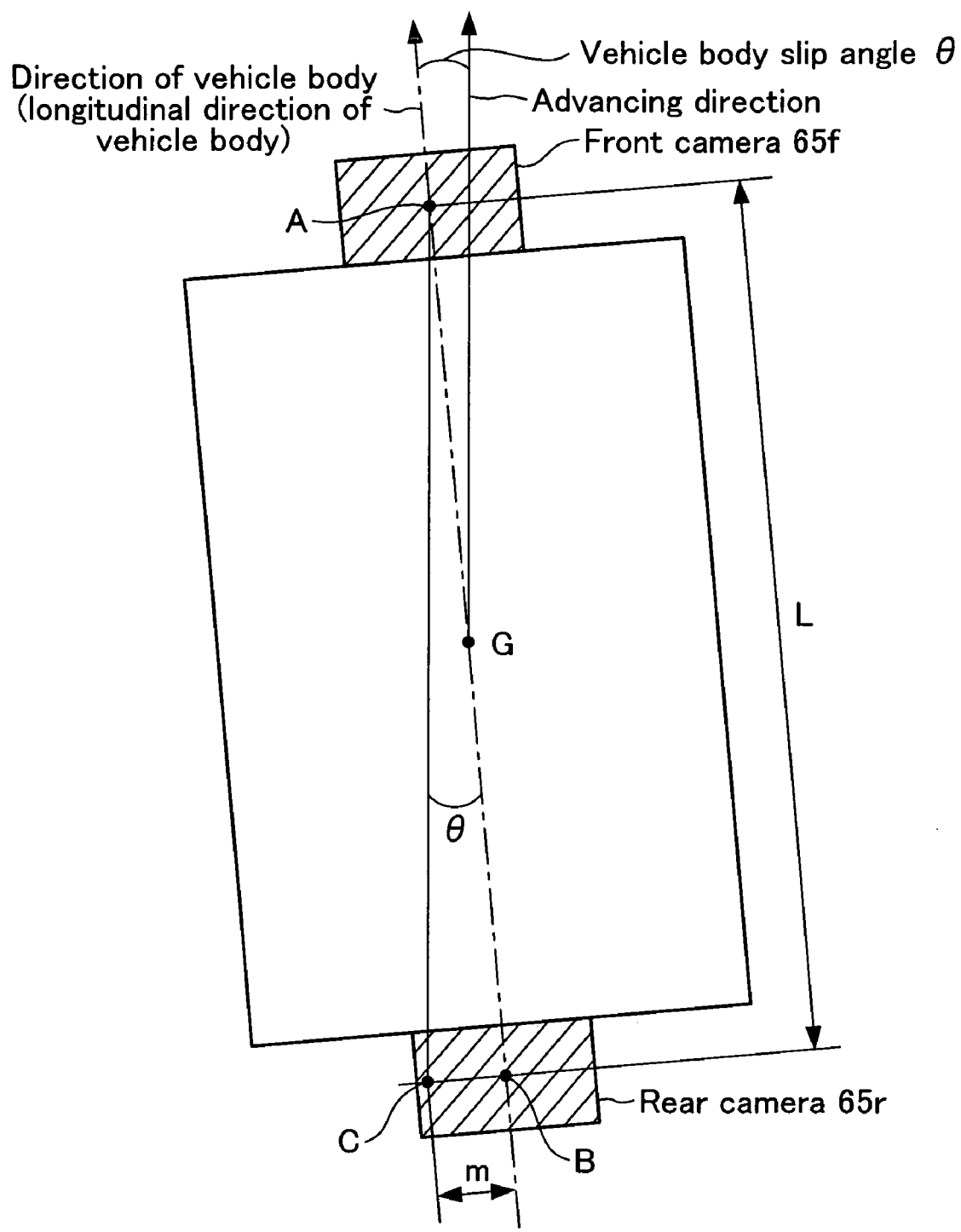
FIG. 3 is a view for explaining a principle for detecting a vehicle body slip angle adopted by the vehicle body slip angle detecting apparatus shown in FIG. 1.

The outline of a method for detecting a vehicle body slip angle θ by the vehicle body slip angle detecting apparatus or a motion control apparatus 10 (hereinafter referred to as "present apparatus") according to the embodiment of the present invention thus configured will be explained with reference to FIG. 3. In FIG. 3, a point G corresponds to a center of gravity of the vehicle body.

FIG. 3 shows the case where the direction of the vehicle body (i.e., the longitudinal direction of the vehicle body) is shifted in the counterclockwise direction seen from the upper side of the vehicle with respect to the advancing direction of the vehicle body (i.e., the case where the vehicle body slip angle θ takes the angle shown in FIG. 3). For the sake of convenience of explanation, in FIG. 3, the rectangular hatched section corresponding to the front camera 65*f* indicates the aforesaid "range of a road surface near below the frontward bumper section at the central position of the vehicle body in the lateral direction" photographed by the front camera 65*f*, and the rectangular hatched section corresponding to the rear camera 65*r* indicates the aforesaid "range of a road surface near below the rearward bumper section at the central position of the vehicle body in the lateral direction" photographed by the rear camera 65*r*. As described above, these two rectangles are equal in shape to each other.

Supposing that the vehicle body slip angle θ is "0". In this case, the range of the road surface photographed by the front camera 65*f* at a certain point (i.e., the aforesaid rectangular range) coincides with the range of the road surface (i.e., the above-mentioned rectangular range) that is photographed by the rear camera 65*r* after the certain point by the delay time (hereinafter referred to as "delay time Tdelay") obtained by dividing a vehicle-body-longitudinal-distance (hereinafter referred to as "camera-to-camera distance L", see FIG. 3) by a vehicle body speed.

In other words, "a certain object" on the road surface on a certain position (for example, a position A at the center of the front image, see FIG. 3) in the image (front image) photographed by the front camera 65*f* at a certain point is on the position (in this case, a position B in the rear image, see FIG. 3) same as that corresponding to the above-mentioned "certain position" in the image (rear image) photographed by the rear camera 65*r* after the certain point by the delay time Tdelay.

On the other hand, in case where the vehicle slip angle θ takes the angle shown in FIG. 3 (precisely, the vehicle body slip angle θ is kept unchanged from the angle shown in FIG. 3 over the delay time Tdelay), the "certain object" on the "certain position" (e.g., the position A) in the front image photographed at the certain point is on a position C (see FIG. 3) that is shifted from the position (in this case, the central position B) corresponding to the above-mentioned "certain position" in the rear image photographed after the certain point by the delay time Tdelay.

A displacement amount m (see FIG. 3) at the position C in the rear image in the direction (hereinafter referred to as "image lateral direction") corresponding to the lateral direction of the vehicle body in the rear image with respect to the central position B in the rear image is a value indicating the vehicle body slip angle θ. Specifically, if the displacement amount m can be obtained, the vehicle body slip angle θ can be detected in accordance with the following equation (1).

$$\theta = \tan^{-1}(m/L) \qquad (1)$$

In other words, the difference between the position of the image lateral direction of the "certain object" in the front image photographed by the front camera 65*f* before the present time by the delay time Tdelay and the position of the image lateral direction of the object same as the above-mentioned "certain object" in the rear image photographed by the rear camera 65*r* at the present time is obtained as the displacement amount m, whereby the vehicle body slip angle θ can be obtained based upon the obtained displacement amount m and the above-mentioned equation (1).

From the above, the vehicle body slip angle θ can be obtained by specifying the position of the image lateral direction of the "object" in the front image (photographed before the present time by the delay time Tdelay) and the position of the image lateral direction of the object same as the aforesaid "object" in the rear image (photographed at the present time). The method for specifying the position of the image lateral direction will be explained below.

Method for Specifying Position of "Object"

When a road surface is photographed by the front and rear cameras 65*f* and 65*r* in a predetermined exposure time (very short period) during the driving of the vehicle, the range of the photographed road surface moves in the advancing direction (constant direction) of the vehicle body by the distance corresponding to the vehicle body speed over the exposure time. Therefore, distribution of color and pattern on the road surface appears as a striped pattern on the photographed image of the road surface.

In addition, the image photographed by the front and rear cameras 65*f* and 65*r* is a monochrome image as described above. The brightness in the monochrome image can be represented by a gray scale having a multiple tone (e.g., 256 tones).

The present apparatus specifies the position of the image lateral direction in which the difference in brightness (i.e., difference in tone) in the front image that is photographed by the front camera 65*f* before the present time by the delay time Tdelay and that has the striped pattern becomes the greatest (hereinafter referred to as "greatest brightness difference"), and handles the specified position of the image lateral direction as the position of the image lateral direction of the "object".

The present apparatus specifies the position of the image lateral direction in which the difference in brightness (i.e., difference in tone) in the rear image that is photographed by the rear camera 65*r* at the present time and that has the striped pattern becomes equal to the greatest brightness difference, and handles the specified position of the image lateral direction as the position of the image lateral direction of the object that is the same as the above-mentioned "object".

Figure 4:
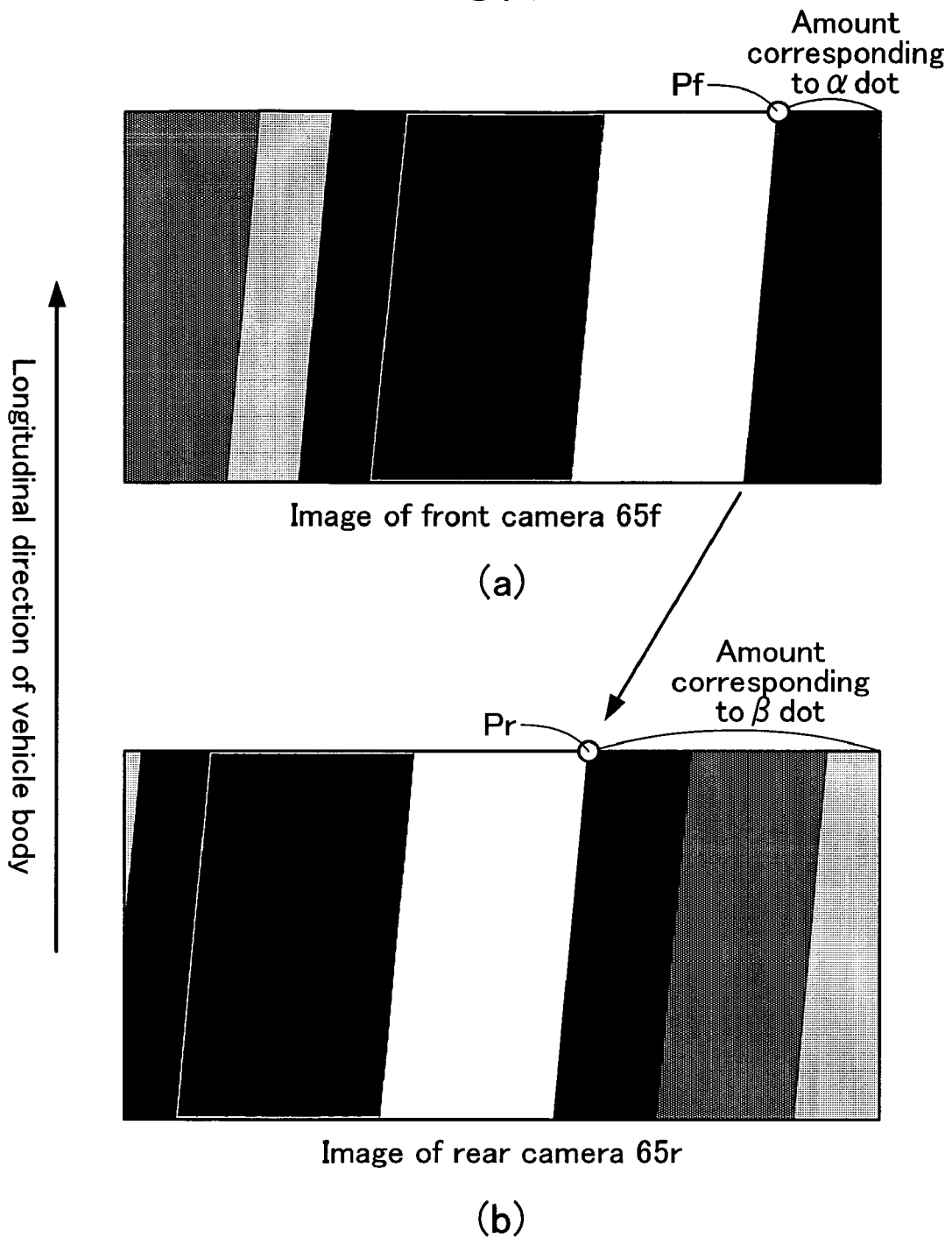
FIG. 4(*a*) is a view showing one example of a front image photographed by the front camera in case where the vehicle body slip angle takes the angle shown in FIG. 3.

FIGS. 4(*a*) and 4(*b*) respectively show one example of a front image photographed by the front camera 65*f* before the present time by the delay time Tdelay and one example of a rear image photographed by the rear camera 65*r* at the present time, in case where the vehicle body slip angle θ takes the angle shown in FIG. 3.

In the case of this example, the position of the image lateral direction of the "object" in the front image shown in FIG. 4(a) is specified at the point Pf in the figure. In this case, shading of asphalt, white lines, unevenness of the road, pebbles, or the like is assumed to be the "object". The position of the lateral image direction of the object same as the above-mentioned "object" in the rear image shown in FIG. 4(b) is specified at the point Pr in the figure.

In the case of this example, a dot number a from the vertex at the upper-right corner to the point Pf in the figure in the front image shown in FIG. 4(a) and a dot number β from the vertex at the upper-right corner to the above-mentioned point Pr in the figure in the rear image shown in FIG. 4(b) are obtained, so that the aforesaid displacement amount m (see FIG. 3) can be obtained from the value (β−α) and the distance corresponding to the "one dot". Accordingly, the vehicle body slip angle θ can be detected based upon the above-mentioned obtained displacement m and the above-mentioned equation (1).

As explained above, the present apparatus specifies the position of the image lateral direction of the "object" in the front image based upon the front image photographed before the present time by the delay time Tdelay by utilizing the brightness difference in the front image, and specifies the position of the image lateral direction of the object same as the above-mentioned "object" in the rear image based upon the rear image photographed at the present time by utilizing the brightness difference in the rear image.

Then, the present apparatus obtains the displacement amount m of the position (see the point C in FIG. 3) of the image lateral direction of the aforesaid "same object" specified in the rear image in the image lateral direction with respect to the position of the image lateral direction of the "object" in the front image specified by the front image (accordingly, the position of the image lateral direction (see the point B in FIG. 3) of the aforesaid "same object" in the rear image that is to be specified in case where the body slip angle θ is assumed to be "0"), and detects the body slip angle θ based upon the obtained displacement amount m and the camera-to-camera distance L. The above is the outline of the method for detecting the vehicle body slip angle according to the present invention.

Outline of OS-US Suppression Control

Subsequently, the outlines of the over-steer suppression control (OS suppression control) and under-steer suppression control (US suppression control) executed by the present apparatus will be explained.

[OS Suppression Control]

It is supposed that the vehicle body slip angle θ is set to assume a positive value when the direction of the vehicle body (accordingly, the longitudinal direction of the vehicle body) is shifted toward the inside of the turning direction with respect to the advancing direction of the vehicle body, and set to assume a negative value when the direction of the vehicle body is shifted toward the outside of the turning direction with respect to the advancing direction of the vehicle body.

The positive value of the vehicle body slip angle θ detected according to the above-mentioned equation (1) means that the vehicle is in a so-called "skid state". The present apparatus determines that the vehicle is in an "over-steer state" when the vehicle body slip angle θ exceeds a predetermined value "θth" (>0), so that it executes the OS suppression control for suppressing the over-steer state.

Specifically, the present apparatus obtains a control amount Gos based upon a predetermined table prepared in advance that specifies the relationship between the vehicle body slip angle θ and the control amount Gos and the vehicle body slip angle θ, and applies to the front wheel located on the outer side of a turning locus a braking force corresponding to the obtained control value Gos (≠0), by means of brake hydraulic pressure. Thus, yawing moment in the direction opposite to the turning direction is forcedly generated on the vehicle to reduce the vehicle body slip angle θ (>0). As a result, the stability in the turning of the vehicle can be maintained.

[US Suppression Control]

A turning angle yaw rate Yrt is firstly defined in accordance with the following equation (2) that is based upon a theoretical formula led from a motion model of the vehicle. This turning angle yaw rate Yrt is a yaw rate obtained based upon the actual steering angle θs.

$$Yrt=(Vso \cdot \theta s)/(ns \cdot Lw) \cdot (1/(1+Kh \cdot Vso^2)) \quad (2)$$

In the above equation (1), Vso is the estimated vehicle body speed that is to be set as described later, Lw is the wheel base of the vehicle, Kh is the stability factor, and ns is the steering gear ratio. The wheel base Lw, stability factor Kh and steering gear ratio ns are constants determined in accordance with the specifications of the vehicle.

The turning angle yaw rate Ytr is set such that when the vehicle is turning in the left direction (i.e., when the actual steering angle θs has a positive value) it becomes a positive value, and when the vehicle is turning in the right direction (i.e., when the actual steering angle θs has a negative value) it becomes a negative value. This theoretical formula is a known formula for calculating the theoretical value of the yaw rate when the vehicle is turning in a state where the steering angle and the vehicle body speed are both constant (at the time of steady circular turning).

Further, in accordance with the following equation (3), the present apparatus calculates the yaw rate deviation ΔYr. Specifically, this yaw rate deviation ΔYr is a value obtained by subtracting the absolute value of the actual yaw rate Yr, that can be obtained by use of the yaw rate sensor 64, from the absolute value of the turning angle yaw rate Yrt.

$$\Delta Yr = |Yrt| - |Yr| \quad (3)$$

When the yaw rate deviation ΔYr calculated with the above equation (3) is a positive value, the vehicle is in a state where the turning radius is greater than in a case where the actual yaw rate of the vehicle is assumed to be equal to the turning angle yaw rate Yrt. Accordingly, the present apparatus determines that the vehicle is in an "under-steer state" when the yaw rate deviation ΔYr is greater than a threshold value Yrth (>0).

When the yaw rate deviation ΔYr exceeds the threshold value Yrth, the present apparatus determines that the vehicle is in an "under-steer state", and executes the US suppression control in order to suppress the under-steer state. Specifically, the present apparatus obtains a control amount Gus, like the case of the aforesaid OS suppression control, and applies to the rear wheel located on the inner side of a turning locus a braking force corresponding to the obtained control amount Gus (≠0), by means of brake hydraulic pressure.

As result, a yawing moment is forcedly generated in the vehicle in a direction same as the turning direction. Accordingly, the absolute value of the actual yaw rate increases, so that the actual yaw rate is controlled to approach the turning angle yaw rate Yrt (i.e., that the yaw rate deviation ΔYr becomes not more than the threshold value Yrth). As a result, the turning-trace performance of the vehicle can be maintained.

Further, when the present apparatus determines that the vehicle is in an "under-steer state" or in an "over-steer state", it performs, in addition to the above-mentioned application of braking force by means of brake hydraulic pressure, the engine-output lowering control which lowers a predetermined amount the output of the engine 21 (specifically, the throttle valve opening) from a level corresponding to the accelerator pedal operation amount Accp. As a result, centrifugal force acting on the vehicle decreases because of the lowered vehicle body speed, so that the turning-trace performance of the vehicle or the stability in turning can be maintained. The above is the outline of the OS-US suppression control.

Actual Operation

Next, the actual operation of the motion control apparatus 10 including the vehicle body slip angle detecting apparatus according to the embodiment of the present invention configured as described above will be explained with reference to FIGS. 5 to 9, which show routines executed by the CPU 51 of the ECU 50 in the form of flowcharts.

Figure 5:
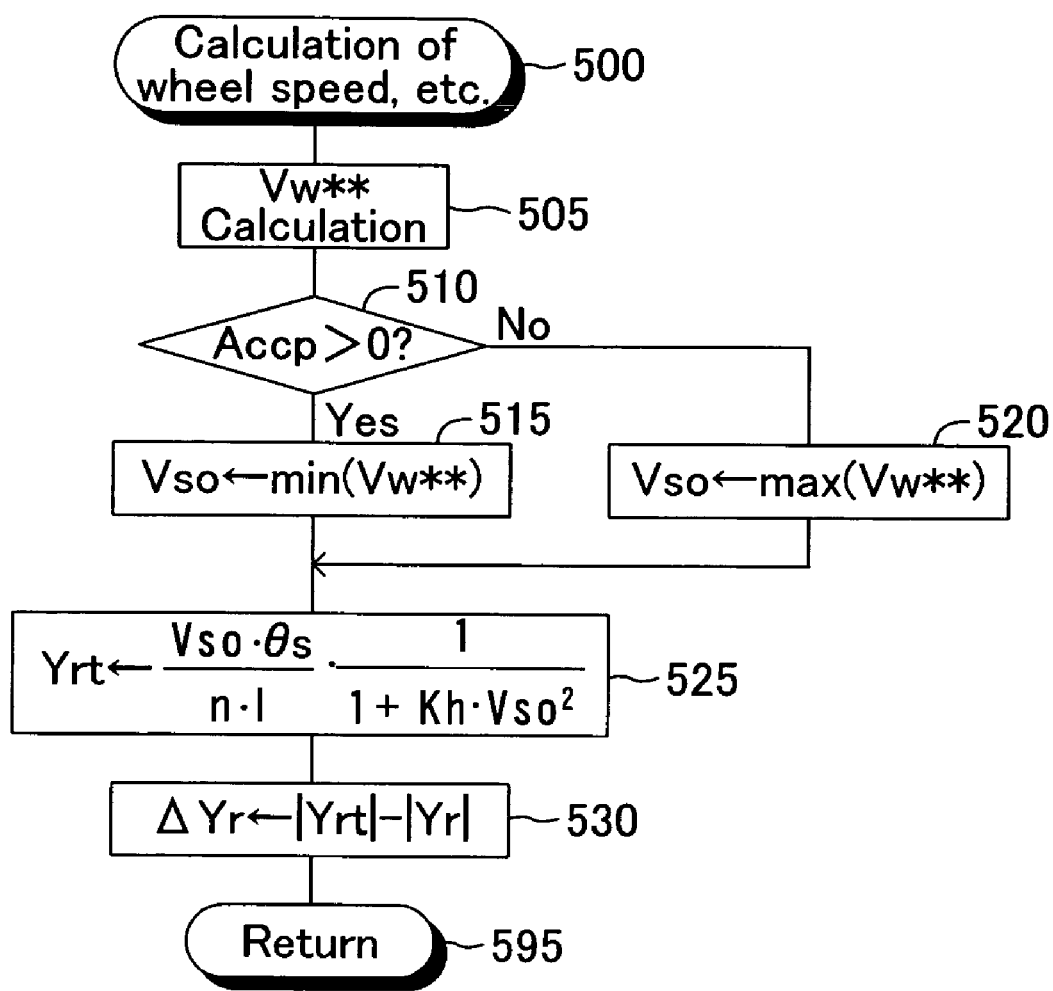

The CPU 51 repeatedly executes a routine shown in FIG. 5 for calculation of wheel speeds, etc. every time a predetermined time (execution interval Δt: e.g., 6 msec) elapses. Accordingly, when a predetermined timing has come, the CPU 51 initiates the processing from step 500 and proceeds to step 505 so as to respectively calculate present wheel speeds (outer circumferential speeds) Vw of the wheels . Specifically, the CPU 51 respectively calculates the wheel speeds Vw on the basis of the fluctuation frequencies of the output values of the wheel speed sensors 61.

Next, the CPU 51 proceeds to step 510 and determines whether the accelerator pedal operation amount Accp obtained from the accelerator opening sensor 62 is greater than "0" (that is, whether the vehicle is in a driven state or in a braked state). When the CPU 51 makes a "Yes" determination (when the vehicle is in a driven state), it proceeds to step 515 so as to select the smallest value from the wheel speeds Vw as the estimated vehicle body speed Vso. On the other hand, when the CPU 51 makes a "No" determination (when the vehicle is in a braked state), it proceeds to step 520 so as to select the largest value from the wheel speeds Vw as the estimated vehicle body speed Vso.

Next, the CPU 51 proceeds to step 525 so as to calculate the steering angle yaw rate Yrt on the basis of the vehicle body speed Vso calculated at the step 515 or step 520, the steering angle Os obtained from the steering angle sensor 63, and the equation (2).

Then, the CPU 51 proceeds to step 530 so as to calculate the yaw rate deviation ΔYr on the basis of the obtained steering angle yaw rate Yrt, the actual yaw rate Yr at the present time obtained from the yaw rate sensor 64, and the equation (3), and then, proceeds to step 595 to end the current execution of the present routine. After that, the CPU 51 updates the respective values by repeatedly executing the present routine at the execution time intervals Δt.

Figure 6:
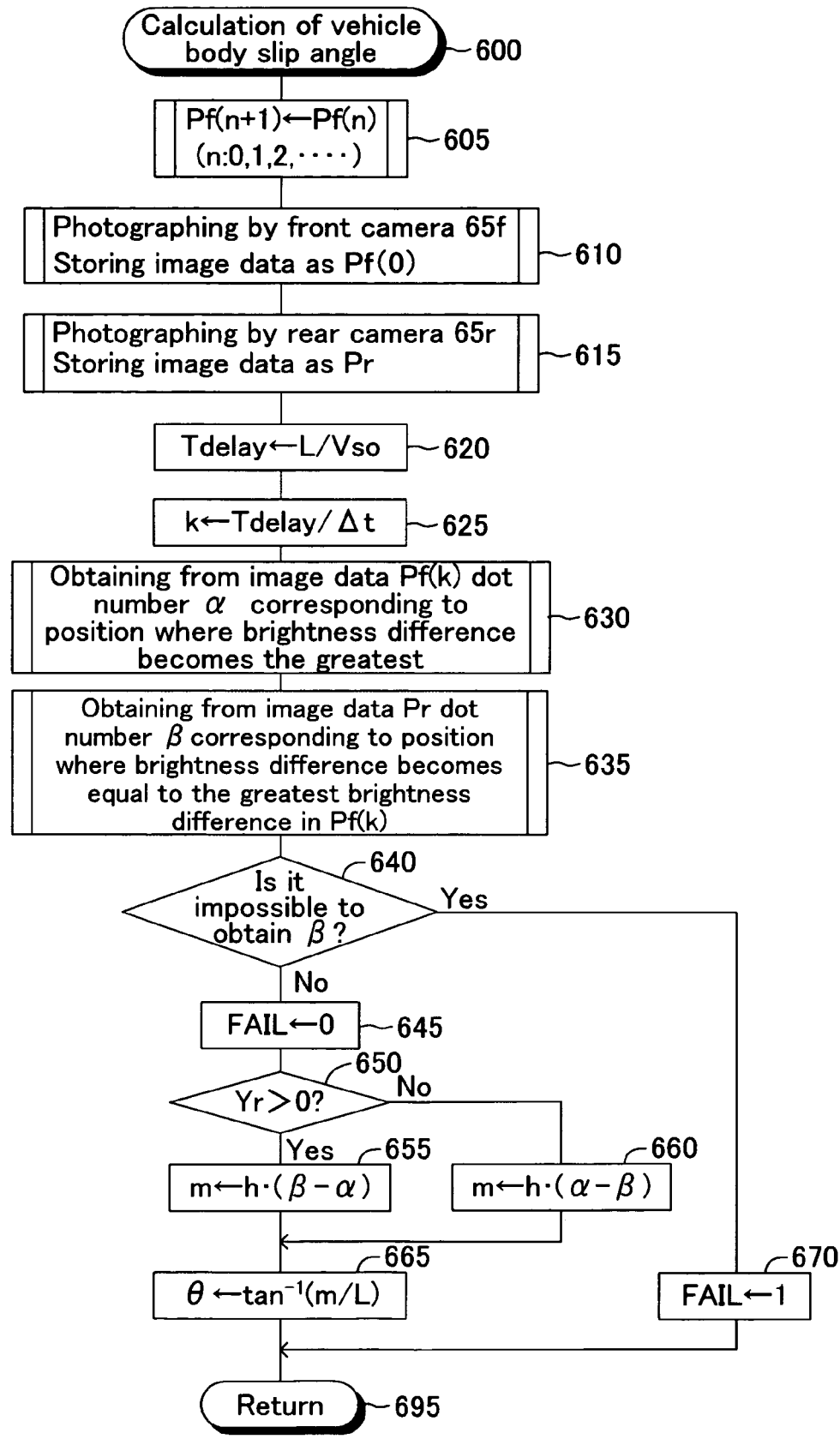
FIG. 6 is a flowchart showing a routine executed by the CPU shown in FIG. 1 for calculating a vehicle body slip angle.

Further, the CPU 51 repeatedly executes a routine shown in FIG. 6 for calculating the vehicle body slip angle θ every time a predetermined time (e.g., 6 msec) elapses. Accordingly, when a predetermined timing has come, the CPU 51 initiates the processing from step 600 and proceeds to step 605 so as to re-store all pieces of image data Pf(n) photographed in the past by the front camera 65f and memorized in the RAM 63 as image data Pf(n+1) (n: integer of not less than "0"). Specifically, image data pieces of Pf(0), pf(1), Pf(2), Pf(3), . . . are respectively re-stored as Pf(1), Pf(2), Pf(3), Pf(4), . . .

Here, the image data Pf(n) indicates the image data of the front image photographed by the front camera 65f at the point before the present time by the time (n·Δt). Accordingly, at the step 605, the "photographing time" corresponding to each piece of image data stored as the image data Pf(n) (n: integer of not less than "0") is changed to the previous point by one execution interval Δt.

Subsequently, the CPU 51 proceeds to step 610 so as to photograph the road surface by the front camera 65f for the predetermined exposure time, and stores the photographed image in the RAM 53 as the image data Pf(0). Then, the CPU 51 proceeds to step 615 so as to photograph the road surface by the rear camera 65r for the predetermined exposure time, and stores the photographed image in the RAM 53 as the image data Pr. The step 610 corresponds to storing means.

Then, the CPU 51 proceeds to step 620 so as to calculate the delay time Tdelay by the division of the camera-to-camera distance L (constant) by the latest value of the vehicle body speed Vso calculated at the step 515 or step 520, and then, the CPU 51 calculates at the next step 625 a value k (integer) for selecting the stored image data of the front image photographed by the front camera 65f before the present time by the delay time Tdelay by the division of the calculated delay time Tdelay by the execution interval Δt.

Subsequently, the CPU 51 proceeds to step 630 so as to obtain the dot number α (see FIG. 4(a)) corresponding to the position in the front image where the brightness difference is the greatest (the above-mentioned greatest brightness difference) on the basis of the image data Pf(k) of the front image photographed before the present time by the delay time Tdelay. Then, the CPU 51 obtains at the next step 615 the dot number β (see FIG. 4(b)) corresponding to the position in the rear image where the brightness difference is equal to the aforesaid greatest brightness difference on the basis of the image data Pr of the rear image photographed at the present time. The step 630 corresponds to object-position specifying means, and the step 635 corresponds to same-object-position specifying means.

Then, the CPU 51 proceeds to step 640 so as to determine whether it is impossible to obtain the dot number β at the step 635 (whether the position of the object same as the "object" specified at the step 630 cannot be specified or not). When the CPU 51 makes a "Yes" determination, it proceeds to step 670 so as to set the value of a flag FAIL to "1". Then, the CPU 51 proceeds to step 695 to end the current execution of the present routine.

The flag FAIL represents that the vehicle is in a state where the body slip angle θ cannot be detected when the value thereof is "1", and that the vehicle is in a state where the body slip angle θ can be detected when the value thereof is "0". The state where the vehicle body slip angle θ cannot be detected corresponds to the case in which the position in the rear image where the brightness difference becomes equal to the above-mentioned greatest brightness difference on the basis of the image data Pr of the rear image is not present for some reason.

On the other hand, when the CPU 51 makes a "No" determination at step 640 (i.e., when the dot number β is obtained), it proceeds to step 645 to set the value of the flag FAIL to "0", and then, determines at the next step 650 whether the actual yaw rate Yr at the present time obtained from the yaw rate sensor 64 is positive or not.

When the CPU 51 makes a "Yes" determination, it proceeds to step 655 to obtain the aforesaid displacement amount m on the basis of the dot number α, the dot number β, and the equation described in the step 655. When the CPU makes a "No" determination, it proceeds to step 660 to obtain the aforesaid displacement amount m on the basis of the dot number α, the dot number β, and the equation described in the step 660. The value h is a distance corresponding to "one dot". Accordingly, the displacement amount m (i.e., the vehicle body slip angle θ) is set to be positive in case where the direction of the vehicle body is shifted to the inner side of the turning locus of the vehicle body with respect to the advancing direction of the vehicle body, regardless of the turning direction of the vehicle body.

Then, the CPU 51 proceeds to step 665 to calculate the vehicle body slip angle θ on the basis of the above-mentioned displacement amount m calculated at the step 655 or step 660 and the equation (1), and then, proceeds to step 695 to end the current execution of the present routine. The step 665 corresponds to vehicle body slip angle detecting means.

Figure 7:
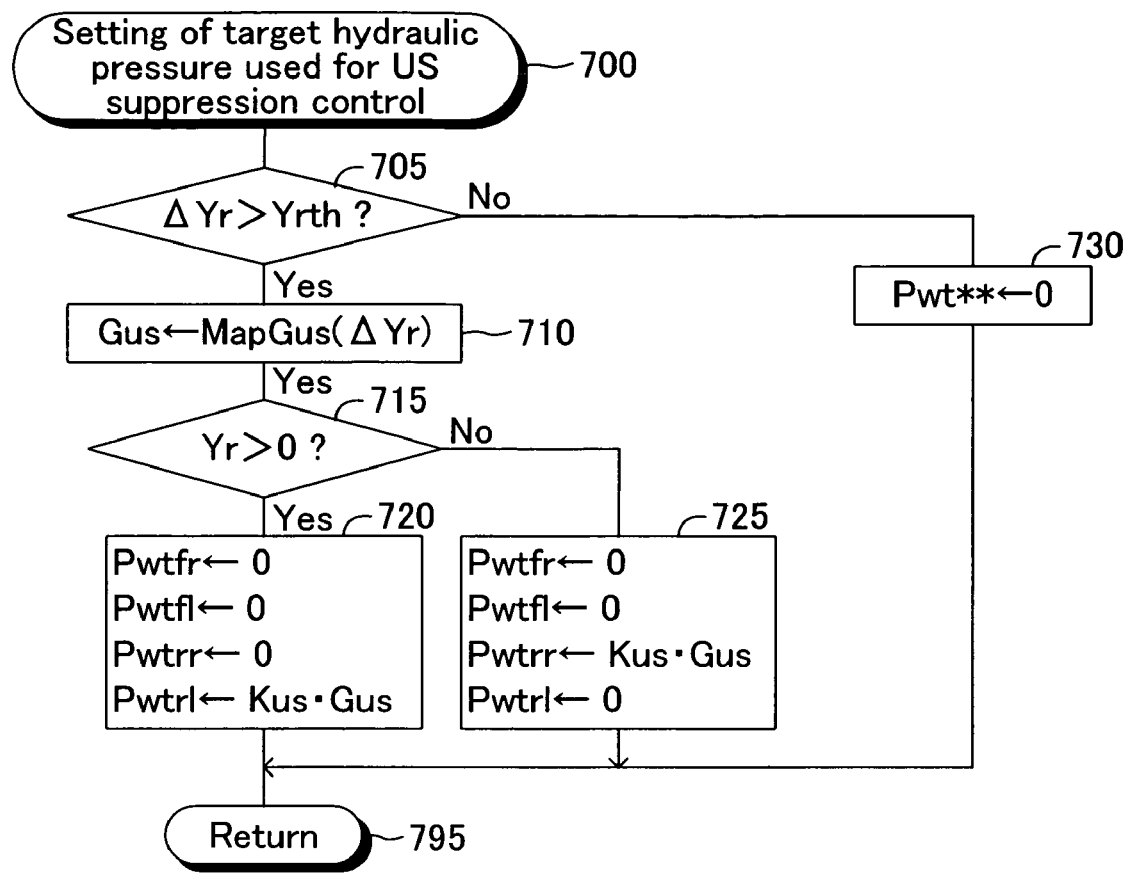
FIG. 7 is a flowchart showing a routine executed by the CPU shown in FIG. 1 for setting a target hydraulic pressure for US suppression control.

Further, the CPU 51 repeatedly executes a routine shown in FIG. 7 for setting the target hydraulic pressure for the US suppression control every time a predetermined time (e.g., 6 msec) elapses. Accordingly, when a predetermined timing has come, the CPU 51 initiates the processing from step 700 and proceeds to step 705 so as to determine whether the yaw rate deviation ΔYr calculated in the previously described Step 530 is greater than the threshold value Yrth. When the CPU 51 makes a "No" determination (i.e., when the vehicle is not in an under-steer state), it proceeds to step 730 so as to set the target hydraulic pressures Pwt for all the wheels to "0". Then, the CPU 51 proceeds directly to step 795** so as to end the current execution of the present routine.

Figure 10:
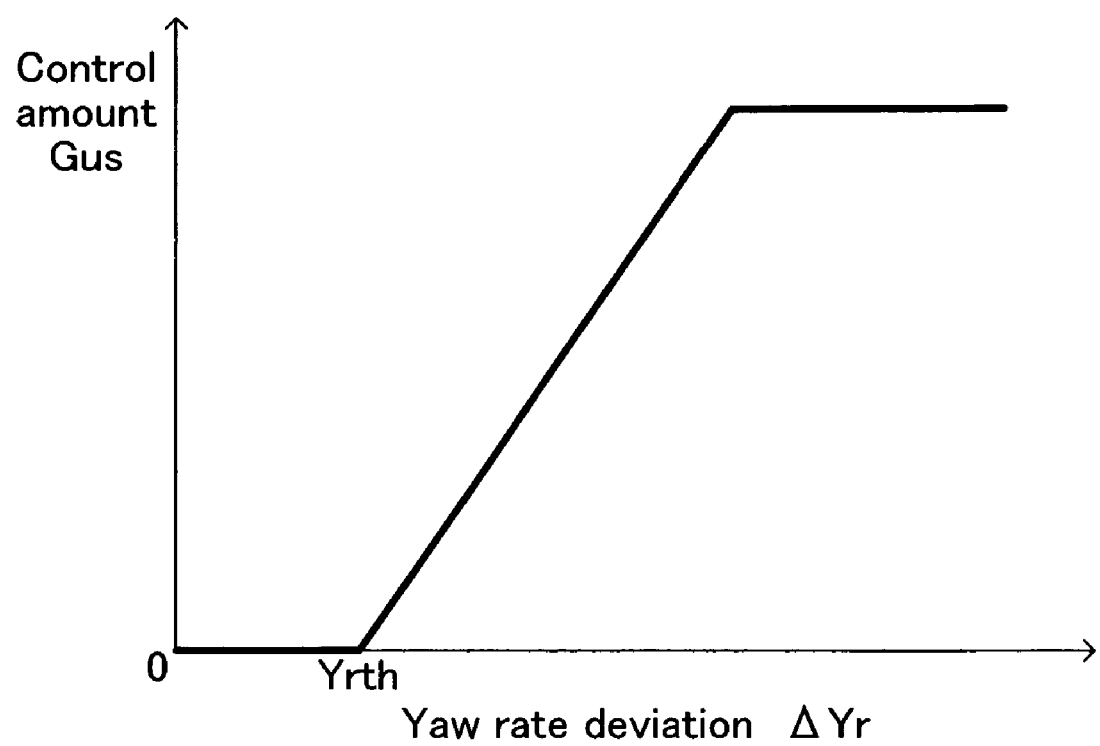
FIG. 10 is a graph showing a table which defines the relation between yaw rate deviation and control amount and to which the CPU shown in FIG. 1 refers.

Here, the yaw rate deviation ΔYr is assumed to be greater than the threshold value Yrth (i.e., the vehicle is assumed to be in an under-steer state). In this case, the CPU 51 makes a "Yes" determination in step 705, and then, proceeds to step 710 so as to obtain the control amount Gus on the basis of the yaw rate deviation ΔYr and with reference to a previously prepared table MapGus, which defines the relation between the yaw rate deviation ΔYr and the control amount Gus shown in FIG. 10. Thus, in case where the yaw rate deviation ΔYr is greater than the threshold value Yrth, it is set such that the control amount Gus (>0) increases as the yaw rate deviation ΔYr increases.

Subsequently, the CPU 51 proceeds to step 715 so as to determine whether the actual yaw rate Yr at the present time obtained from the yaw rate sensor 64 is positive (i.e., turning direction is leftward or rightward).

When the vehicle is turning to the left, the CPU 51 makes "Yes" determination in step 715, and then, proceeds to step 720 so as to set the target hydraulic pressure Pwtrl for the rear left wheel RL corresponding to the rear wheel located on the inner side of the turning locus to a value obtained by multiplying the obtained control amount Gus by a coefficient Kus (positive constant) for US suppression control, and set the target hydraulic pressure Pwt for the remaining three wheels to "0". Then, the CPU 51 proceeds to step 795** so as to end the current execution of the present routine.

Meanwhile, when the vehicle is turning to the right, the CPU 51 makes a "No" determination in step 715, and then, proceeds to step 725 so as to set the target hydraulic pressure Pwtrr for the rear right wheel RR corresponding to the rear wheel located on the inner side of the turning locus to a value obtained by multiplying the obtained control amount Gus by the coefficient Kus for US suppression control, and set the target hydraulic pressure Pwt for the remaining three wheels to "0". With this operation, the target hydraulic pressure Pwt for the rear wheel located on the inner side of the turning locus is set to a value (>0) corresponding to the yaw rate deviation ΔYr.

Figure 8:
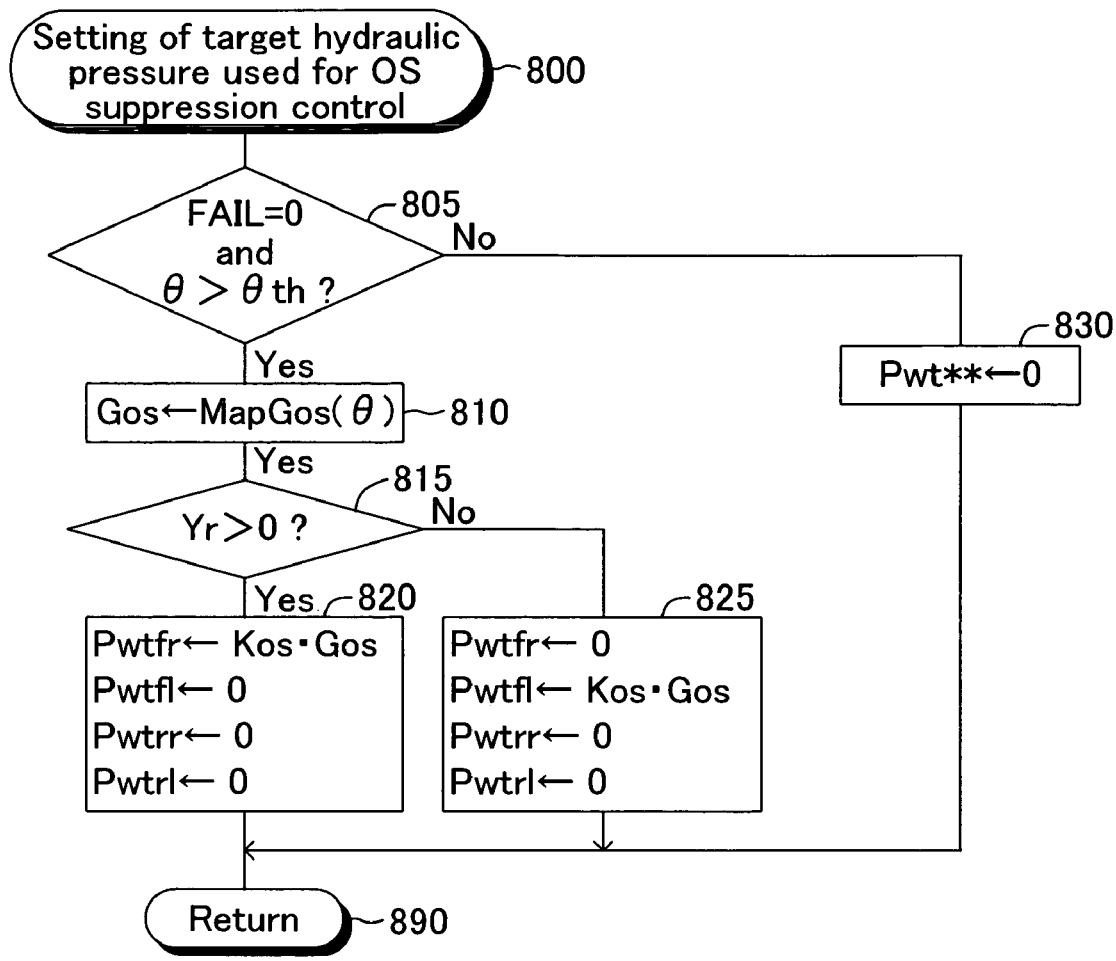
FIG. 8 is a flowchart showing a routine executed by the CPU shown in FIG. 1 for setting a target hydraulic pressure for OS suppression control.

Further, the CPU 51 repeatedly executes a routine shown in FIG. 8 for setting the target hydraulic pressure for the OS suppression control every time a predetermined time (e.g., 6 msec) elapses. Accordingly, when a predetermined timing has come, the CPU 51 initiates the processing from step 800 and proceeds to step 805 so as to determine whether the value of the FAIL is "0" (i.e., the vehicle is in the state where the vehicle body slip angle θ can be detected) and the latest value of the vehicle body slip angle θ calculated at the previous step 665 is greater than the threshold value θth (>0).

When the CPU 51 makes a "No" determination (i.e., when the vehicle is in the state where the vehicle body slip angle θ cannot be detected, or the vehicle is in the state where the vehicle body slip angle θ can be detected but not in an over-steer state), it proceeds to step 830 to set the target hydraulic pressure Pwt for all wheels to "0". Then, the CPU 51 proceeds to step 895** so as to end the current execution of the present routine.

Figure 11:
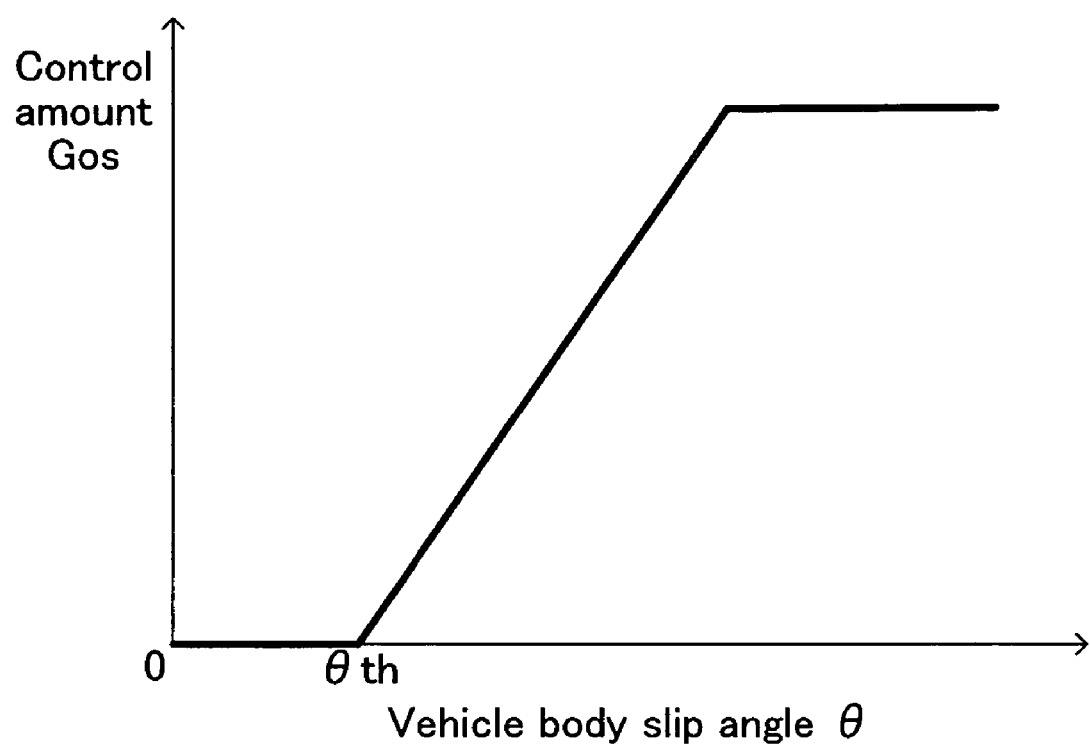
FIG. 11 is a graph showing a table which defines the relation between vehicle body slip angle and control amount and to which the CPU shown in FIG. 1 refers.

It is supposed here that the vehicle is in the state where the vehicle body slip angle θ can be detected and is in an over-steer state. The CPU 51 makes a "Yes" determination at step 805, and then, proceeds to step 810 to obtain the control amount Gos on the basis of the vehicle body slip angle θ and with reference to a previously prepared table MapGos, which defines the relation between the vehicle body slip angle θ and the control amount Gos shown in FIG. 11. Thus, in case where the vehicle body slip angle θ is greater than the threshold value θth, it is set such that the control amount Gos (>0) increases as the vehicle body slip angle θ increases.

Subsequently, the CPU 51 proceeds to step 815 so as to determine whether the actual yaw rate Yr obtained from the yaw rate sensor 64 is positive (i.e., turning direction is leftward or rightward).

When the vehicle is turning to the left, the CPU 51 makes "Yes" determination in step 815, and then, proceeds to step 820 so as to set the target hydraulic pressure Pwtfr for the front right wheel FR corresponding to the front wheel located on the outer side of the turning locus to a value obtained by multiplying the obtained control amount Gos by a coefficient Kos (positive constant) for over-steer suppression control, and set the target hydraulic pressure Pwt for the remaining three wheels to "0". Then, the CPU 51 proceeds to step 895** so as to end the current execution of the present routine.

Meanwhile, when the vehicle is turning to the right, the CPU 51 makes a "No" determination in step 815, and then, proceeds to step 825 so as to set the target hydraulic pressure Pwtfl for the front left wheel FL corresponding to the front wheel located on the outer side of the turning locus to a value obtained by multiplying the obtained control amount Gos by the coefficient Kos for over-steer suppression control, and set the target hydraulic pressure Pwt for the remaining three wheels to "0". With this operation, the target hydraulic pressure Pwt for the rear wheel located on the outer side of the turning locus is set to a value (>0) corresponding to the yaw rate deviation ΔYr.

Figure 9:
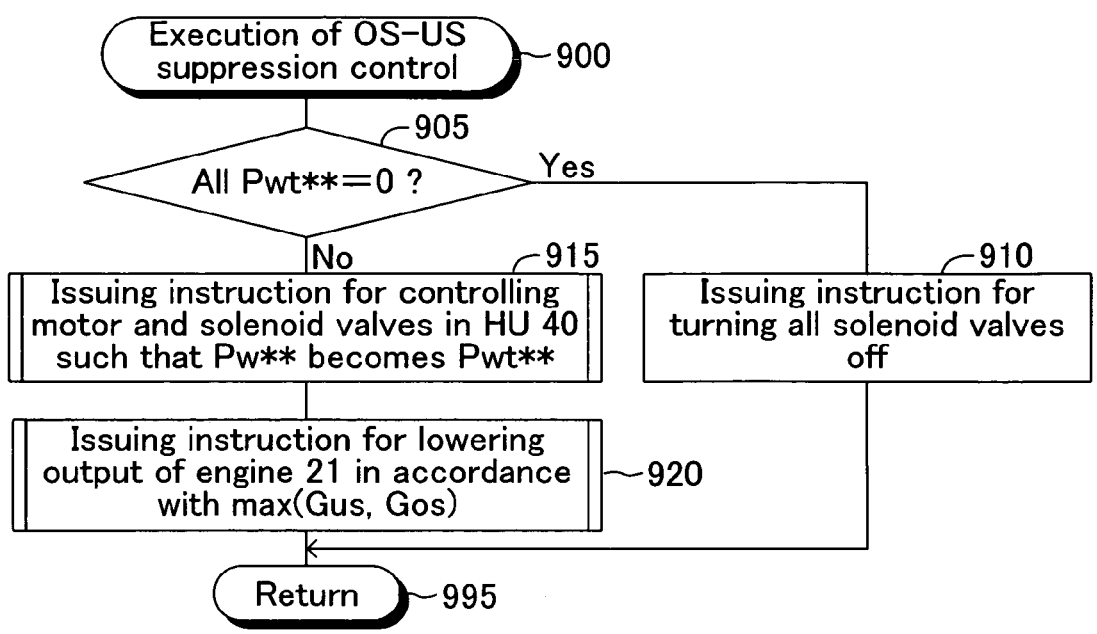
FIG. 9 is a flowchart showing a routine executed by the CPU shown in FIG. 1 for executing the OS-US suppression control.

Further, the CPU 51 repeatedly executes a routine shown in FIG. 9 for executing the OS-US suppression control every time a predetermined time (e.g., 6 msec) elapses. When a predetermined timing has come, the CPU 51 initiates the processing from step 900 and proceeds to step 905 so as to determine whether the target hydraulic pressure Pwt** for all wheels is "0" or not. When the CPU 51 makes a "Yes" determination, it proceeds to step 910 so as to bring all the solenoid valves of the HU 40 into an unexcited state and bring the motor (hydraulic pump) into an inactivated state. Subsequently, the CPU 51 proceeds directly to step 995 so as to end the current execution of the present routine.

Meanwhile, when the CPU 51 makes a "No" determination in step 905, it proceeds to step 915 and issues an instruction for controlling the motor and the solenoid valves of the HU 40 such that the wheel cylinder pressure Pw of the wheel  coincides with the set final target hydraulic pressure Pwt**. With this operation, the OS-US suppression control is performed through application of braking force by means of brake hydraulic pressure.

Subsequently, the CPU 51 proceeds to step 920 so as to issue an instruction for lowering the output of the engine 21 by an amount corresponding to the greater one of the control amount Gus obtained in the previously described step 710 and the control amount Gos obtained in the previously described step 810. With this operation, the above-mentioned engine-output lowering control on the basis of the OS-US suppression control is executed. Then, the CPU 51 proceeds to step 995 so as to end the current execution of the present routine.

As explained above, the vehicle body slip angle detecting apparatus according to the embodiment of the present invention specifies the position (for example, the position at the center A in FIG. 3) of the image lateral direction of the "object" in the front image based upon the image data Pf(k) of the front image photographed by the front camera 65f before the present time by the delay time Tdelay by utilizing the brightness difference in the front image, and specifies the position (for example, the position at the point C in FIG. 3) of the image lateral direction of the object same as the above-mentioned "object" in the rear image based upon the image data Pr of the rear image photographed by the rear camera 65r at the present time by utilizing the brightness difference in the rear image.

Then, the present apparatus obtains the displacement amount m of the position (see the point C in FIG. 3) of the image lateral direction of the aforesaid "same object" specified in the rear image in the image lateral direction with respect to the position of the image lateral direction of the "object" in the front image specified by the front image (the position at the center A, accordingly, the position of the image lateral direction (see the point B in FIG. 3) of the aforesaid "same object" in the rear image that is to be specified in case where the body slip angle θ is assumed to be "0"), and detects the body slip angle θ in accordance with the equation (1) based upon the obtained displacement amount m and the camera-to-camera distance L.

The camera-to-camera distance L is generally sufficiently longer than the length of the road surface in the longitudinal direction of the vehicle body on the image photographed by the camera fixed to the vehicle body. Therefore, the displacement amount m can be relatively a great value even if the vehicle body slip angle θ is very small. Accordingly, the vehicle body slip angle θ can precisely be detected even if the vehicle body slip angle θ is very small.

According to the vehicle motion control apparatus according to the embodiment of the present invention, the over-steer suppression control is started and executed based upon the detected vehicle body slip angle θ as described above. Therefore, the over-steer suppression control can precisely be started and executed based upon the precisely detected vehicle body slip angle θ (in particular, a very small slip angle).

The present invention is not limited to the above-mentioned embodiment, and various modifications may be employed within the scope of the invention. For example, although the position of the "object" in the front image and the position of the object same as the above-mentioned "object" in the rear image are specified by utilizing the brightness difference in the images in the aforesaid embodiment, they may be specified by utilizing a difference in color phase (e.g., difference in distribution ratio of RGB) in the images in case where the front and rear cameras 65f and 65r are those capable of obtaining a color image.

In this case, the apparatus specifies the position of the image lateral direction in which the difference in color phase (i.e., difference in distribution ratio of RGB) in the front image that is photographed by the front camera 65f before the present time by the delay time Tdelay becomes the greatest (hereinafter referred to as "greatest color phase difference"), and handles the specified position of the image lateral direction as the position of the image lateral direction of the "object". Further, the apparatus specifies the position of the image lateral direction in which the difference in color phase in the rear image that is photographed by the rear camera 65r at the present time becomes equal to the greatest color phase difference, and handles the specified position of the image lateral direction as the position of the image lateral direction of the object same as the above-mentioned "object".

Moreover, although the over-steer suppression control is executed in the aforesaid embodiment as the vehicle stabilization control based upon the vehicle body slip angle θ, other controls (e.g., roll-over preventing control) may be started and executed as the vehicle stabilization control.

What is claimed is:

1. A vehicle body slip angle detecting apparatus comprising:
a front camera fixed to a front section of a vehicle body of a vehicle for photographing a road surface on which the vehicle is running;
a rear camera fixed to a rear section of the vehicle body of the vehicle for photographing a road surface on which the vehicle is running;
object-position specifying means for specifying a position of an object in a front image, which is an image of the road surface photographed by the front camera, by utilizing a difference in brightness in the front image;
same-object-position specifying means for specifying a position of an object, which is same as the object whose position in the front image is specified by the object-position specifying means, in a rear image, which is an image of the road surface photographed by the rear camera, by utilizing a difference in brightness in the rear image;
vehicle body slip angle detecting means for detecting a vehicle body slip angle of the vehicle on the basis of a comparison result between the position of the object in the front image specified by the object-position specifying means and the position of the same object in the rear image specified by the same-object-position specifying means.

2. A vehicle body slip angle detecting apparatus according to claim 1, wherein
the object-position specifying means specifies the position of the object in the front image by obtaining a first dot number corresponding to a position in the front image where the difference in brightness in the front image is the greatest, and the same-object-position specifying means specifies the position of the same object in the rear image by obtaining a second dot number corresponding to a position in the rear image where the difference in brightness in the rear image is equal to the greatest different in brightness in the front image.

3. A vehicle body slip angle detecting apparatus according to claim 2, wherein the vehicle body slip angle detecting means does not detect the vehicle body slip angle of the vehicle when the same-object-position specifying means can not obtain the second dot number.

4. A vehicle body slip angle detecting apparatus according to claim 1, wherein the front image and the rear image have the same rectangular shape, and distribution of color and pattern on the road surface appears as striped patterns on the front image and the rear image.

5. A vehicle body slip angle detecting apparatus according to claim 1, wherein the front image and the rear image are monochrome images.

6. A vehicle body slip angle detecting apparatus according to claim 1, wherein the front image and the rear image are color images.

7. A vehicle body slip angle detecting apparatus according to claim 1, wherein the object-position specifying means specifies the position of the object in the front image by specifying a position, in the lateral direction, in the front image where the difference in brightness in the front image is the greatest, and the same-object-position specifying means specifies the position of the same object in the rear image by specifying a position, in the lateral direction, in the rear image where the difference in brightness in the rear image is equal to the greatest difference in brightness in the front image.

8. A vehicle slip angle detecting method adapted to a vehicle provided with a front camera fixed to a front section of a vehicle body of the vehicle for photographing a road surface on which the vehicle is running; and a rear camera fixed to a rear section of the vehicle body of the vehicle for photographing a road surface on which the vehicle is running, the method comprising:

specifying a position of an object in a front image, which is an image of the road surface photographed by the front camera, by utilizing a difference in brightness in the front image;

specifying a position of an object, which is same as the object whose position in the front image is specified, in a rear image, which is an image of the road surface photographed by the rear camera, by utilizing a difference in brightness in the rear image; and detecting a vehicle body slip angle of the vehicle on the basis of a comparison result between the specified position of the object in the front image and the specified position of the same object in the rear image.

9. A vehicle motion control apparatus comprising:

vehicle stabilization control means for starting and executing a vehicle stabilization control for maintaining a stability of a vehicle, based upon the vehicle body slip angle detected by the vehicle body slip angle detecting apparatus according to claim 1.

* * * * *